though of course some cooling will occur in this short distance. The spray is directed so as to coat essentially all of the fibers as they pass through the spray. Depending on the amount of coating solution desired to be added, the density of the spray can be varied as well as the speed of the fibers through the spray. Time in the spray is not important so long as the desired amount is applied.

United States Patent [19]
Zucker

[11] 4,286,999
[45] Sep. 1, 1981

[54] METHOD OF IMPROVING PROPERTIES OF CERAMIC FIBERS

[75] Inventor: Jerry Zucker, Charleston, S.C.

[73] Assignee: Raybestos-Manhattan, Inc., Trumbull, Conn.

[21] Appl. No.: 127,235

[22] Filed: Mar. 4, 1980

[51] Int. Cl.³ .............................................. C04B 31/44
[52] U.S. Cl. .......................... 106/308 Q; 106/308 F; 106/308 N; 106/308 S; 428/378; 428/391
[58] Field of Search .................... 106/308 Q; 428/378, 428/391

[56] References Cited
U.S. PATENT DOCUMENTS

| | | | |
|---|---|---|---|
| 4,141,751 | 2/1979 | Moreland | 106/308 Q |
| 4,214,914 | 7/1980 | Ivanchev et al. | 106/308 Q |

OTHER PUBLICATIONS

Ken-React Bulletin No. KR-0975-2 "Factor 4" p. 28. An Abbreviated Reference Manual for Ken-React Titanium Coupling Agents–(Date prior to 7/23/79).

*Primary Examiner*—Helen M. McCarthy
*Attorney, Agent, or Firm*—Gary, Juettner & Pyle

[57] ABSTRACT

Hot ceramic fibers, preferably those freshly manufactured, are provided with a coating containing an ionic coupling agent such as either a silane or titanate coupling agent and preferably also a surfactant. The coated fiber is then allowed to cool. The fiber, with the silane or titanate bonded therein has greatly improved flexibility, strength, abrasion resistance and most importantly dispersibility in water.

7 Claims, No Drawings

METHOD OF IMPROVING PROPERTIES OF CERAMIC FIBERS

BACKGROUND OF THE INVENTION

The term "ceramic fibers" as used herein means polycrystalline metal oxide fibers having a high melt temperature typically in excess of 3,000° F. Such fibers generally contain aluminum oxide or calcium oxide and silica, as well as smaller amounts of other metal oxides, such as ferric, titanium and magnesium. A typical ceramic fiber will comprise, for example, in excess of 30% aluminum or calcium oxide, in excess of 45% silica, with any remainder as other metallic oxides. Specific examples of compositions for ceramic fibers include the following:

|  | EXAMPLE 1 | EXAMPLE 2 | EXAMPLE 3 |
|---|---|---|---|
| $Al_2O_3$ | 47.5% | 45% | 10% |
| CaO |  |  | 35% |
| $SiO_2$ | 49% | 52% | 45% |
| $Fe_2O_3$ | 1% | 1% | 3% |
| $TiO_2$ | 2% | 2% | 2% |
| Misc. Metal Oxides | MgO 0.5% | Trace | .5% |

The fibers are made by several processes, one of which involves the formation of a melt at oven in excess of 3200° F., and then contacting a spinning or slinging wheel or high velocity gas with the melt to produce individual fibers, which are then cooled and collected. Various compositions for ceramic fibers and methods for making the same are described in the following patents: U.S. Pat. Nos. 2,557,834; 2,674,539; 2,699,397; 2,710,261; 2,714,622; and 3,007,806.

Ceramic fibers of the foregoing nature have a variety of present and proposed uses, particularly as fillers and insulating media. The use of such fibers, however, has been somewhat limited because of their limited flexibility, strength, abrasion resistance and most critically their lack of dispersibility in water or other liquids. For example, ceramic fiber of typical size distribution as currently produced will not form a stable slurry or dispersion in water, even with the addition of surface active agents and requires high shear agitation to produce even moderately uniform suspensions. Due to the shear sensitivity of this class of fibers, the fiber length is reduced drastically in the process which reduces their ultimate produce thermal value and product strength.

The ability to disperse fiber would be desirable from the viewpoint of producing a better variety of shapes or forms with improved physical properties of strength and uniformity. Such products include papers, webs, foams, molded shapes, small yarns and the like.

SUMMARY OF THE INVENTION

The present invention resides in the application of effective amounts of an organic coupling agent, either a silane or titanate, and also preferably a surfactant to the surface of ceramic fibers while hot, both preferably applied as the fibers as being produced. The coupling agent and surfactant are preferably applied as a mixture by misting or spraying a dilute solution thereof onto the fiber at a relatively low rate, less than 10% by weight, of application. Thereafter, the fibers are allowed to cool and exhibit superior properties over untreated fibers, including improved flexibility, strength, abrasion resistance and dispersibility.

Upon application, the coupling agent bonds to the fiber and results in an ionic surface on the fiber. The surfactant remains as a residue on the fiber and serves to provide additional anionic or cationic ions respectively, for improved dispersibility, reduced surface tension, and other improved qualities.

DESCRIPTION OF THE PREFERRED EMBODIMENT

Ceramic fibers as defined herein are conventionally manufactured by providing a molten mass of the ceramic material, and then spinning, slinging, or high velocity gas impinging, the mass into a chamber under conditions to form individual fibers. Various processes for producing such fibers are well known to those skilled in the art.

In accordance with the process of the present invention, an ionic coating is applied to the fiber shortly after the formation thereof and before the fiber has cooled to room temperature. Alternatively, but less desirably, fiber may be heated to the desired temperature and the coating applied.

The temperature at which the coating is applied is dependent upon numerous factors, including cooling rate, dilution and vaporization rate of the solvent containing the coating, reactivity rate between the particular fiber and particular coating materials, and atmosphere in the cooling chamber. Preferably, the temperature of the fiber after the coating has been applied and solvent evaporated is in excess of 275° F. The maximum temperature of application is preferably less than the decomposition temperature for any of the components used in the coating, but typically, the finished temperature of the coated fiber should not exceed 525° F.

The coating of the present invention comprises a mixture of a hydrolyzable silane or titanate coupling agent and an ionic surfactant. Suitable surfactants, for example, include carboxy acids, sulfuric esters, alkane sulfonates, alkyl aromatic sulfonates and others. Specific examples include sodium oleate, sodium lauryl sulfate, and polyethylene glycol alkyl aryl ether. The surfactant used is preferably dispersible in water and aids or enhances the ability of the fiber to be dispersed and also improves handling properties of the dry fiber.

The coupling agents used in the present invention are silanes, titanates, or mixtures thereof. Suitable silanes, for example, include hydrolyzable, allyl, amino-alkyl, beta chloropropyl, epoxy mercapto, methacrylato, phenyl, thioalkyl, thio-alkaryl and vinyl silanes, their hydrolysis products and polymers of the hydrolysis products and mixtures thereof. Specific detailed evaluations conducted on the list of silane coupling agents below, indicates the use of gamma-Methacryloxypropyltrimethoxysilane and/or vinyl-tris (2-methoxyethoxy) silane in combination with sodium oleate to give the best overall results of the silanes tested.

| TYPE | DESCRIPTION |
|---|---|
| 1. A-1100 | gamma-Aminopropyltriethoxysilane |
| 2. A-1160 | gamma-Ureidopropyltriethoxysilane |
| 3. A-1120 | N-beta-(aminoethyl)gamma-aminopropyltrimethoxysilane |
| 4. A-174 | gamma-Methacryloxy-propyltrimethoxysilane |
| 5. A-172 | Vinyl-tris(2-methoxyethoxy) silane |
| 6. A-151 | Vinyltriethoxysilane |

| TYPE | DESCRIPTION |
| --- | --- |
| 7. A-186 | beta-(3,4-Epoxycyclohexy) ethyltrimethoxysilane |
| 8. A-187 | gamma-Glycidoxypropyltrimethoxysilane |
| 9. A-189 | gamma-Mercaptopropyltrimethoxysilane |

Of other major groups of coupling agents, titanates also produce various degrees of benefit for the aforementioned and described application. Of the list of those evaluated, which follows, four were especially effective; titanium di(dioctylpyrophosphate) oxyacetate, isopropyl tri(dioctylpyrophosphate) titanate, titanium dimethacrylate oxyacetate, and titanium diacrylate oxyacetate, or their ethoxylated ester forms. Suitable titanate coupling agents tested include:

| TITANATE COUPLING AGENT | DESCRIPTION |
| --- | --- |
| KR-TTS | isopropyl, triisostearoyl titanate |
| KR-201 | diisostearoyl, ethylene titanate |
| KR-33BS | isopropyl trimethacryl titanate |
| KR-133BS | titanium dimethacrylate, oxyacetate |
| KR-39BS | isopropyl, triacryl titantate |
| KR-139BS | titanium diacrylate, oxyacetate |
| KR-34S & BS | isopropyl tricumylphenyl titanate |
| KR-134S & BS | titanium di(cumylphenolate) oxyacetate |
| KR-44 | isopropyl, tri(N ethylamino-ethylamino) titanate |
| KR-52S | isopropyl, tri(2-aminobenzoyl) titanate |
| KR-63S | isopropyl, tri(tetraethylenetriamine) titanate |
| KR-66S | isopropyl, tri(3-mecaptopropionyl) titanate |
| KR-27S | isopropyl triricinoyl titanate |
| KR-9S | isopropyl, tridodecylbenzenesulfonyl titanate |
| KR-12 | isopropyl, tri(dioctylphosphato) titanate |
| KR-112S | titanium di(dioctylphosphate) oxyacetate |
| KR-212 | di(dioctylphosphato) ethylene titanate |
| KR-38S | isopropyl tri(dioctylpyrophosphato) titanate |
| KR-138S | titanium di(dioctylpyrophosphate) oxyacetate |
| KR-238S | di(dioctylpyrophosphato) ethylene titanate |
| KR-58FS | tri(butyl, octyl pyrophosphato) isopropyl titanate |
| KR-158FS | titanium di(butyl, octyl pyrophosphate) de (dioctyl, hydrogen phosphite)oxyacetate |
| KR-62ES | di(butyl, methyl pyrophosphato), isopropyl titanate mono(dioctyl, hydrogen) phosphite |
| KR-262ES | di(butyl, methyl pyrophosphato) ethylene titanate mono(dioctyl, hydrogen phosphate) |
| KR-36C | tetraisopropyl di(tridecylphosphito) titanate |
| KR-41B | tetraisopropyl, di(dioctylphosphito) titanate |
| KR-46B | tetraoctyloxytitanium di(ditridecylphosphite) |
| KR-55 | tetra(2,2 diallyloxymethyl-1 butoxy titanium di(di-tridecyl) phosphite |

The proportions of the coupling agent and surfactant may vary with respect to each other. Preferably, the mixture is applied as a dilute aqueous spray containing from about 1 or about 6 percent each of the coupling agents and surfactant and the remainder as water and/or suitable solvent. The ratio of applied coating to fiber, by weight, is preferably less than 10 percent by weight or preferably from about 1:200 to about 1:20.

Specific ceramic fiber spray formulation examples include:

EXAMPLE A

2% sodium oleate aqueous solution to which is added and dissolved A-174 silane coupling agent at a mixed product composition of 3%.

EXAMPLE B

3% saponified mixed fatty acids aqueous solution (including linoleic, palmitic and elaidic acid) to which is added A-172 silane coupling agent to produce a concentration of 1.5% A-172.

After application of the coupling agent and surfactant, the fiber is allowed to cool. Thereafter, the surface modified fiber may be dispersed in water with the aid of mixing and optional addition of surfactants or other dispersing aids.

I claim:

1. A process for improving the water dispersibility of ceramic fibers comprising the step of applying a coating to said fibers, said coating comprising a mixture of a coupling agent consisting of hydrolyzable silanes, titanates and mixtures thereof and an ionic surfactant, said coupling agent and surfactant being added in amounts sufficient to render the ceramic fiber water dispersible.

2. The process of claim 1 wherein said coating is applied to the ceramic fibers while said fibers are at a temperature above room temperature.

3. The process of claim 1 wherein said coating is applied to said ceramic fibers shortly after formation thereof and while hot.

4. The process of claim 3 wherein said coating is applied within the temperature range of from about 275° to about 525° F.

5. The process of improving the dispersibility and other properties of polycrystalline metal oxide fibers having a melt temperature typically in excess of 3,000° F., said process comprising the step of applying to said fibers while heated to a temperature above room temperature an ionic coating comprising a mixture of an ionic surfactant and a coupling agent selected from the class consisting of hydrolyzable silanes, titanates, and mixtures thereof, the ratio of the applied coating to fiber, by weight being from about 1:200 to about 1:20.

6. The method of claim 5 wherein the coated fibers are allowed to cool and are thereafter dispersed in water.

7. Water dispersible polycrystalline metal oxide ceramic fiber having a coupling agent bonded to the surfaces thereof together with an ionic surfactant, said coupling agent being selected from the class consisting of hydrolyzable silanes and titanates, said surfactant and coupling agent being present in an amount sufficient to render said fiber water dispersible.

* * * * *